ated in right angular relation to each

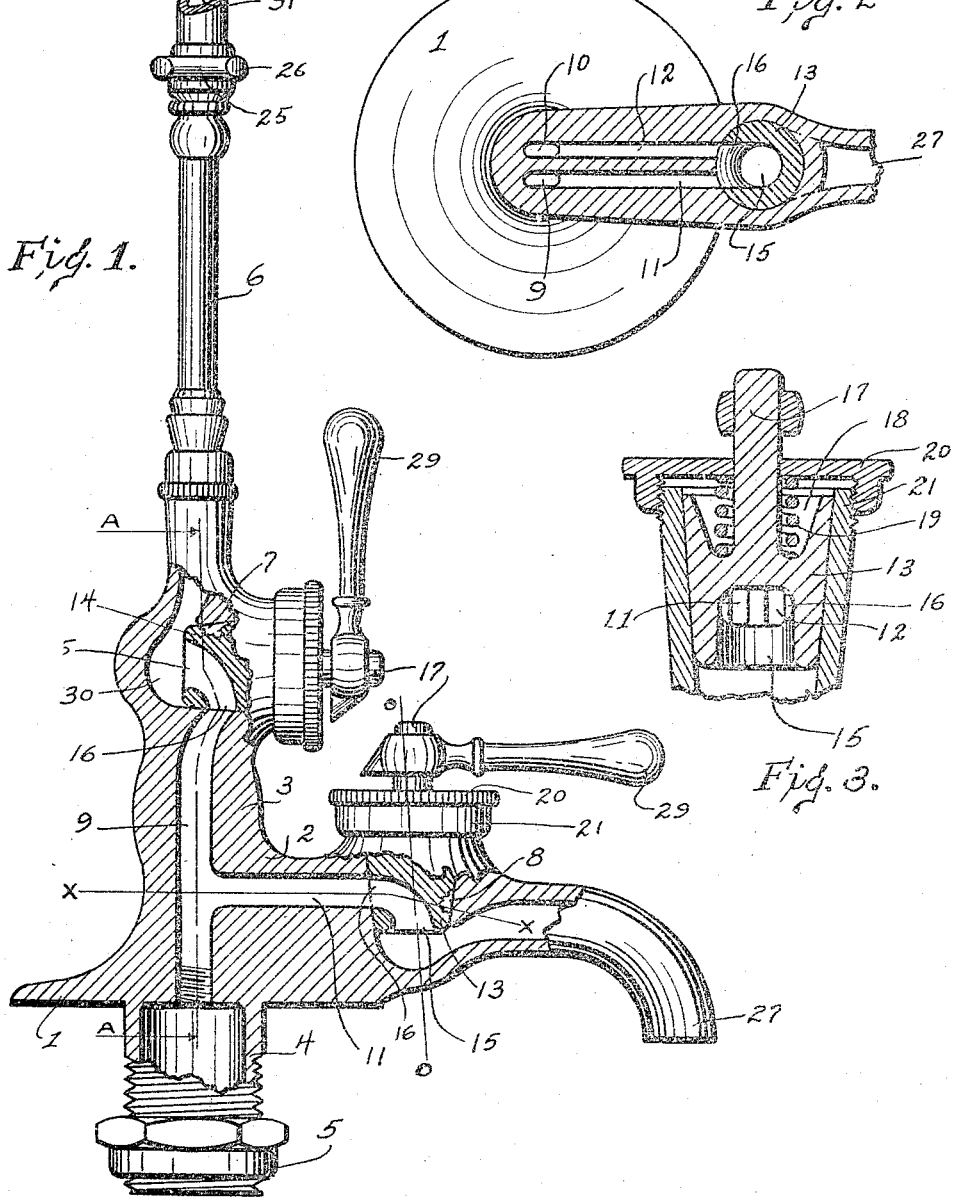

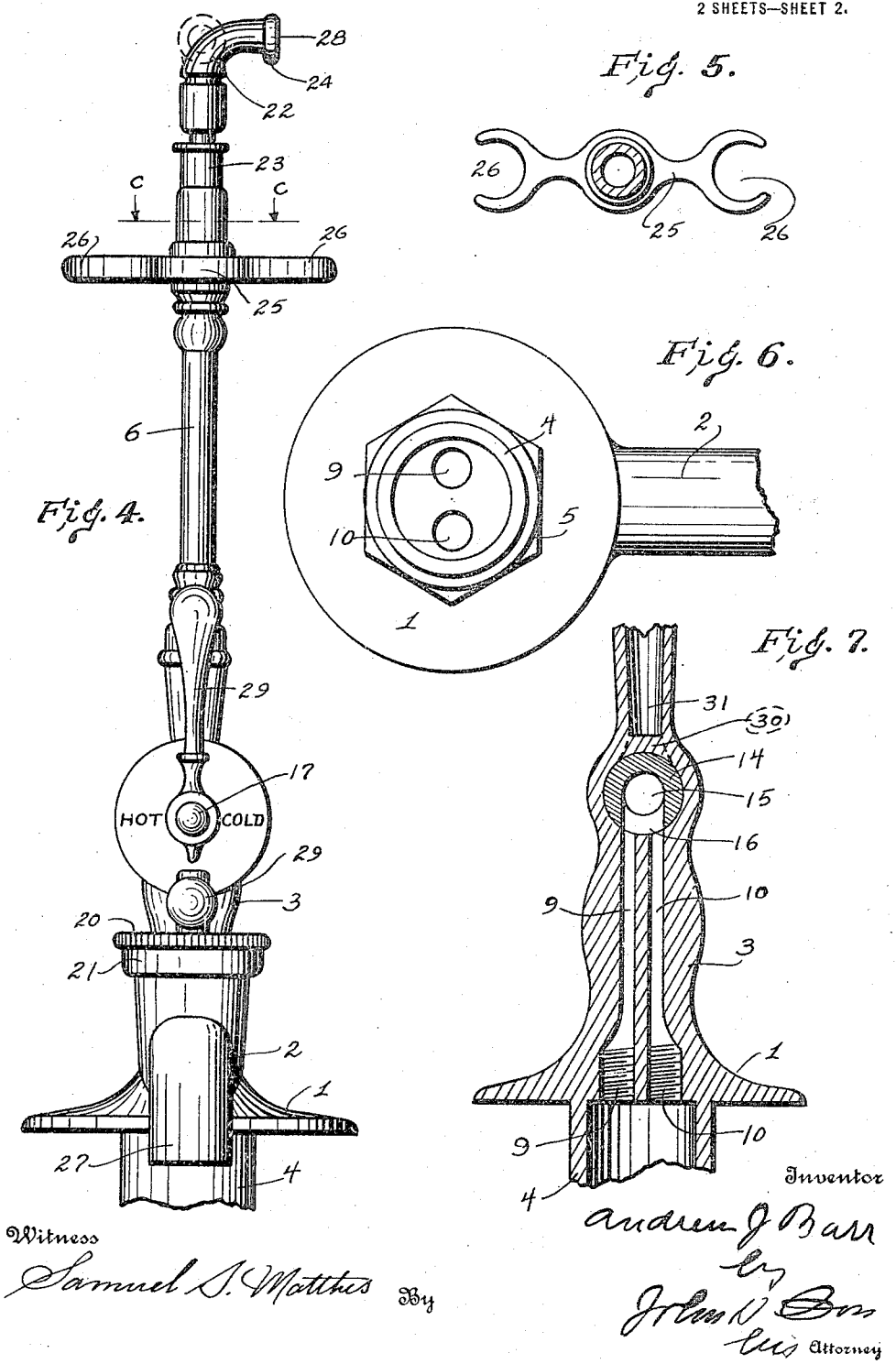

UNITED STATES PATENT OFFICE.

ANDREW J. BARR, OF MANSFIELD, OHIO, ASSIGNOR OF ONE-HALF TO HERMAN E. HOMBERGER, OF MANSFIELD, OHIO.

COMBINED FIXTURE AND VALVES FOR LAVATORIES OR THE LIKE.

1,228,739.  Specification of Letters Patent.  Patented June 5, 1917.

Application filed August 28, 1916. Serial No. 117,148.

*To all whom it may concern:*

Be it known that I, ANDREW J. BARR, a citizen of the United States of America, residing at Mansfield, in the county of Richland and State of Ohio, have invented certain new and useful Improvements in a Combined Fixture and Valves for Lavatories or the like, of which the following is a specification.

This invention relates to a combined fixture and valves for lavatories or the like which is provided with plurality of valves, and combined in such a manner as to permit different liquids or a mixture of liquids varying in temperature to be drawn from each valve by the manipulation thereof.

The primary object of the present invention consists in providing (in its preferred form) a fixture with two valves arranged in right angular relation with respect to each other and adapted to afford facilities for drawing hot or cold water, different liquids, or a mixture thereof from two outlets, one being connected to one portion of the fixture and the other being connected to another portion of the fixture.

A further object is to provide a fixture having a member secured to one portion thereof by a swivel connection which provides means of connecting a rubber hose or the like thereto, and further to provide means of attaching a bracket to said member to maintain the rubber hose in its proper place when not in use.

A further object of this invention is to provide tapered plug valves to fit tapered seats formed in the fixture and means to maintain a yielding pressure upon the valves to maintain them constantly upon their seats thereby automatically taking up the wear of the valve mechanism and to further construct and arrange said pressure means in such a manner as to provide for exerting said yielding pressure upon the valves without providing any opening or aperture in the valve fixture other than the one in which the valve is inserted.

A further object of this invention is to construct a fixture that is provided with separate ports to permit different kinds of liquids, or liquids of the same kind but of different temperatures to flow through said ports, and to be drawn therefrom in a separate or mixed state by the coöperation of valves which intersect the ports and operate in connection therewith to permit the flow of liquid through each outlet of the valves.

A further object of this invention is to provide a fixture having valves applied thereto that will permit of different kinds of mixtures and different temperatures of liquids to be drawn from separate outlets, the valves preferably being arranged in a vertical and horizontal relation with respect to each other.

I attain these and other objects by the construction of the combined fixture and valves illustrated in the accompanying drawing in which:

Figure 1 is a side elevation of the valve fixture partly in section showing the fixture and valves assembled.

Fig. 2 is a cross sectional view on the line X X of Fig. 1. Fig. 3 is a vertical sectional view of one of the valves taken on the line O O of Fig. 1.

Fig. 4 is an end elevation of Fig. 1 showing the swivel connection and bracket attached to the one portion of the fixture.

Fig. 5 is a plan view of the bracket and cross section of the fixture taken on the line C C of Fig. 4.

Fig. 6 is a bottom plan view of the fixtures showing the inlet hot and cold water ports.

Fig. 7 is a vertical section taken on the line A A of Fig. 1 showing the separate ports for hot and cold water and the partition wall therebetween.

In the drawings reference numeral 1 represents the base flange, 2 one portion, and 3 another portion of the body of the fixture or valve casing. They are preferably arranged in right angular relation to each other. 4 represents a downwardly depending nipple for use in fastening the fixture to a lavatory or the like and 5 the lock nut. A tubular member 6 is made integral or attached to the portion 3 for a purpose which will be described hereinafter. The fixture is provided with valve seats 7 and 8 formed respectively in the portions 2 and 3. The body portion 3 of the fixture is provided with internally threaded inlet ports 9 and 10 which intersect and communicate with ports 11 and 12 which are formed in the portion 2 of the fixture.

Tapered plug valves 13 and 14 are fitted to the valve seats 7 and 8. The bottoms of the plug valves are bored as shown at 15 to intersect and communicate with openings 16 which are formed in the plug valves in angular relation to the bores. The openings 16 formed in each valve are adapted to register with the ports formed in the valve fixture. Valve stems 17 are made integral or secured to the plug valves and annular recesses or pockets 18 are formed in the top of the plug valves in which coil compression springs 19 are nested. The coil springs projects beyond the top of the valve seats and caps 20 which are provided with interiorly threaded depending annular flanges 21 are threadably connected to the exteriorly threaded body portions 21 of the valves. When the caps are connected to the body portions of the valves the coil springs are compressed until the threads of the parts are connected. The caps are then screwed down until the springs are compressed to exert the desired tension to seat the valves perfectly, yielding pressure being thereby constantly exerted upon the valves to take up the wear of the parts. A connecting fitting 22 is attached to the tubular member by a swivel joint connection at 23 and its free end 24 is enlarged to receive and engage a rubber hose or the like.

At an appropriate place upon the tubular member, a bracket 25 is mounted and adapted to maintain the hose or the like in proper place by engagement of the hose in the spanner ends 26 of the bracket.

Reference numeral 27 represents the faucet of one valve, 28 the outlet aperture of the other valve and 29 the operating handles of the valves. The operation of the combined fixture and valves is as follows: The supply of liquid hot, cold, medium or of different kinds is conducted to the nipple 4 from any convenient source of supply by gravity or pressure to and through the inlet ports 9 and 10, communicating with intersecting ports 11 and 12 through the opening 16 in the valve 13 and out through the bore 15 of the valve into the faucet 27. While the above described operation is being performed the liquid is simultaneously being conducted through the ports 9 and 10 which intersect and communicate with the opening 16 in the valve 14, communicating with the bore 15, from which it passes into an offset passageway 30 formed in the portion 3 of the fixture; thence into the outlet passageway 31 of the tubular member 6.

By the manipulation of the valve handles 29, the valves can be turned to register with both ports at the same time, they also can be turned to register with either port separately closing one of the ports, or they can be turned to register with the ports to permit a desired quantity of hot or cold liquid, a mixture thereof or of different kinds of liquids to flow from one outlet in a mixture containing different quantities of the different kinds of liquids or to permit the flow of liquids of different temperatures from either or both outlets simultaneously or separately.

Attention is called to the fact that a combined fixture and valves arranged and constructed as described permits of the use of the fixture for lavatory purposes by the manipulation of one valve and the use of the other valve for shampooing purposes or the like simultaneously, thereby economizing in space around the lavatory, eliminating an obstruction from the lavatory and providing a cheap and efficient structure to accomplish the results usually requiring at least two separate valves, fixtures and fittings.

I claim:—

1. A valve casing, having a plurality of main ports, a valve for controlling the discharge from said ports singly and collectively, ports intersecting said main ports, and a valve for controlling the discharge from said intersecting ports.

2. A valve casing, comprising a body having a plurality of main ports therein, means for controlling the discharge from said ports, a plurality of ports in the body, and each of which ports intersects a single main port, and means for controlling the discharge of said intersecting ports.

3. A valve casing made of a single casting having a plurality of main ports formed therein, and a plurality of ports formed in the casting communicating with said main ports, and means for controlling the flow of liquid through said ports.

4. A valve casing having a plurality of main ports formed therein, and ports intersecting said ports, and a valve for selectively controlling the discharge of fluid from each of said main and intersecting ports, and a valve for controlling the discharge from each of said main ports.

5. A valve casing, having a plurality of main ports, and a plurality of auxiliary ports, each auxiliary port connected to a main port, a valve for controlling the flow from said main ports singly and collectively, and another valve for controlling the flow from said auxiliary ports singly and collectively.

6. A valve casing, comprising two parallel ports, a valve for controlling the discharge from said ports singly and collectively, and two auxiliary ports in said casing, each auxiliary port communicating with a main port, and a valve for controlling the discharge from said auxiliary ports singly and collectively.

7. A valve casing, comprising a body having a longitudinal member and a member extending at an angle thereto, said longitudinal and angular members having ports formed therein, each of the ports in the angular member communicating with a port in the longitudinal member, and a valve in each member for controlling the flow through said ports of the respective members.

In testimony whereof I affix my signature.

ANDREW J. BARR.

Copies of this patent may be obtained for five cents each, by addressing the "Commissioner of Patents, Washington, D. C."